United States Patent
Miyabe

(10) Patent No.: US 9,071,457 B2
(45) Date of Patent: Jun. 30, 2015

(54) PROVIDER NETWORK AND PROVIDER EDGE APPARATUS

(75) Inventor: Masatake Miyabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 683 days.

(21) Appl. No.: 13/328,455

(22) Filed: Dec. 16, 2011

(65) Prior Publication Data

US 2012/0182876 A1 Jul. 19, 2012

(30) Foreign Application Priority Data

Jan. 18, 2011 (JP) .................................. 2011-007921

(51) Int. Cl.
*H04L 12/26* (2006.01)
*H04L 12/46* (2006.01)

(52) U.S. Cl.
CPC ........ *H04L 12/4625* (2013.01); *H04L 12/4633* (2013.01); *H04L 12/4641* (2013.01)

(58) Field of Classification Search
CPC .................................. H04J 3/14; H04L 45/28
USPC .......................... 370/230, 242, 252, 254, 395
See application file for complete search history.

(56) References Cited

U.S. PATENT DOCUMENTS

| | | | | |
|---|---|---|---|---|
| 7,136,374 B1 * | 11/2006 | Kompella | ...................... | 370/352 |
| 7,817,668 B2 | 10/2010 | Igarashi et al. | | |
| 2007/0091827 A1 * | 4/2007 | Boers et al. | .................... | 370/255 |
| 2008/0112323 A1 | 5/2008 | Agmon et al. | | |
| 2010/0208742 A1 | 8/2010 | Kafle et al. | | |
| 2012/0163381 A1 * | 6/2012 | Lam | .............................. | 370/392 |

FOREIGN PATENT DOCUMENTS

| | | |
|---|---|---|
| JP | 2007-043678 A | 2/2007 |
| JP | 2008-312191 A | 12/2008 |
| JP | 2010-509880 | 3/2010 |

OTHER PUBLICATIONS

JPOA—Notice of Reason for Rejection dated May 13, 2014 with its English translation issued in the corresponding Japanese application No. 2011-007921.

* cited by examiner

*Primary Examiner* — Samina Choudhry

(74) *Attorney, Agent, or Firm* — Fujitsu Patent Center

(57) ABSTRACT

A provider edge apparatus comprises an ingress processing unit to generate an encapsulated frame to be transmitted to another provider edge apparatus coupled to another customer edge apparatus, wherein the encapsulated frame includes a frame directed to the another customer edge apparatus, an egress processing unit to extract a frame to be forwarded to the specified customer edge apparatus, a storage to store an identifier of the provider edge apparatus and an identifier of the another provider edge apparatus when the specified customer edge apparatus is coupled to the another edge apparatus via a second access line, wherein the identifiers corresponds to a group identifier indicating an access line group belonging the first access line and the second access line, and a filter to discard the encapsulated frame or a frame in the encapsulated frame satisfying a filter condition.

12 Claims, 13 Drawing Sheets

PROVIDER NETWORK AND PROVIDER EDGE APPARATUS

CROSS-REFERENCE TO RELATED APPLICATION

This application is based upon and claims the benefit of priority of the prior Japanese Patent Application No. 2011-007921, filed on Jan. 18, 2011, the entire contents of which are incorporated herein by reference.

FIELD

The present invention relates to a provider network and a provider edge apparatus.

BACKGROUND

Over the recent years, Ethernet (registered trademark) has been utilized not only as LAN (Local Area Network) but also as a provider network as an infrastructure technology which supports a packet network. Provider Backbone Bridges (PBB) standardized in IEEE 802.1ah is a technology used for a provider to provide a service for transmitting a Media Access Control (MAC) frame to a customer via a provider network which employs Ethernet (registered trademark). According to the PBB, a customer MAC frame (which is referred to as a "service frame") that is transmitted and received between customer points (lodgments) is encapsulated with another MAC frame (MAC-in-MAC encapsulation) in the provider network linking up the customer points to each other and is forwarded within the provider network. The MAC frame with which the service frame is encapsulated is called a "backbone MAC frame".

FIG. 11 is an explanatory view of a conventional example of a service providing network for providing a MAC frame transmission servicer by use of the PBB. The example depicted in FIG. 11 is that the service providing network includes a provider network including a plurality of provider edge (PE) apparatuses. Customer edge apparatuses (CE) serving as the customer points are coupled to the respective provider edge apparatuses (PE). Thus, each of the CEs can receive a MAC frame forwarding service via the provider network in a case of transmitting the MAC frame to another CE.

The service frame, which is transmitted from the customer edge apparatus (e.g., CE#12 in FIG. 11) on a transmission side and addressed to another customer edge apparatus (e.g., CE#13), contains a payload (user data), a MAC source address (SA) and a MAC destination address (DA). The service frame is attached with a service instance identifier (ISID or I-SID) associated with the service and a backbone VLAN (Virtual Local Area Network) identifier (BVID or B-VID) in the provider edge apparatus (which is called an ingress edge node, e.g., PE#12 in FIG. 11) located at an ingress of the provider network.

Further, the ingress edge node (PE#12) attaches, to the service frame, a backbone MAC source address (which is abbreviated to BSA or "B-SA") associated with the ingress edge node as well as attaching a proper backbone MAC destination address (which is abbreviated to BDA or "B-DA") by referring to the MAC destination address (DA) of the service frame, and sends the service frame to within the provider network. This type of backbone MAC frame is transmitted to within the provider network.

Then, the backbone MAC frame reaches, based on the BDA, an egress edge node (which is a provider edge apparatus on an egress side, e.g., PE#13 in FIG. 11) of the provider network. The egress edge node restores the backbone MAC frame back into the original service frame (decapsulation) by removing the BDA, the BSA, the BVID and the ISID therefrom, and sends the decapsulated service frame to the reception-sided customer edge apparatus (corresponding to CE#13 in FIG. 11) associated therewith. Furthermore, the egress edge node learns a route of the backbone MAC frame from the SA and the BSA contained in the backbone MAC frame.

By the way, it is much of importance to improve availability of the service in terms of providing the service or transmitting the MAC frame. For example, it is considered to adopt a configuration called "multihoming" by way of one means for improving the availability. In a case where the multihoming is applied, a plurality of access lines is prepared between one single customer edge apparatus being a customer point and the provider edge apparatuses, and further the customer edge apparatus is coupled to the plurality of provider edge apparatuses via the plurality of access lines (refer to, e.g., Patent document 1 and Patent document 2).

FIG. 12 is an explanatory view of a conventional example of realizing the multihoming in the service providing network by use of the PBB and of a problem arising at this time. The customer edge apparatus CE#13 is coupled to the provider network (PBB network) via the provider edge apparatuses PE#13 and PE#14 by employing two access lines AL13 or AL14. Adoption of such a configuration enables continuation of providing the service against failures in the access lines AL13 and AL14 and a failure in the provider edge apparatus PE#13 or PE#14 and also enables the availability to be improved.

In the case of adopting the network architecture illustrated in FIG. 12, such a network topology is configured as to take a loop topology consisting of the customer edge apparatus CE#13, the provider edge apparatuses PE#13, the PBB network serving as the provider network and the provider edge apparatus PE#14.

When this type of loop topology is configured, as depicted in FIG. 12, such a problem of loop of service frames arises that the MAC frame (service frame) transmitted from the customer edge apparatus CE#13 is returned (loopback) again to the customer edge apparatus CE#13 via the provider network (PBB network).

Further, there is a case in which a provider edge apparatus PE of the transmission destination, which is associated with a designated destination address (MAC DA) of the service frame sent from the customer edge apparatus CE#11 and received by the provider edge apparatus PE#11, is unknown. In this case, the provider edge apparatus PE#11 performs flooding of the service frames to all other provider edge apparatuses PE belonging to the same service. At this time, if the multihoming configuration depicted in FIG. 12 is adopted, such a problem occurs that the multiple service frames redundantly reach the customer edge apparatus CE#13, namely, the same service frames redundantly reach the customer edge apparatus CE#13.

The network is built up so as not to logically configure the loop topology of the network in order to avoid the occurrence of the problem described above. For instance, with respect to a case where the loop topology exists in the physical network topology, Spanning Tree Protocol (STP) specified in IEEE Standard 802.1D or Rapid STP (RSTP) defined as an improved version of the STP or Multiple STP (MSTP) is proposed as a method of configuring a loopless logical network topology.

FIG. 13 is an explanatory view of the conventional example which uses the STP. FIG. 13 illustrates an example of implementing such setting as to block a port, on the side of the customer edge apparatus CE#13, of the provider edge apparatus PE#13. With this setting, the loop topology is eliminated from on the logical network topology. Accordingly, the looping problem and the redundant arrival problem of the service frames are avoided.

[Patent document 1] Japanese Patent Application Laid-Open Publication No. 2007-43678

[Patent document 2] Japanese Patent Application Laid-Open Publication No. 2008-312191

SUMMARY OF THE INVENTION

The prior arts described above have, however, the following problems. To be specific, in an example illustrated in FIG. 13, a service traffic flows through only one of a plurality of access lines (which are an access line AL13 and an access line AL14 in FIG. 13). Consequently, efficiency of utilization of the access lines AL13, AL14 and provider edge apparatuses PE#13, PE#14 decreases.

In other words, in the case of using STP as an existing technology, the frame looping and the frame redundant arrivals, which occur on the occasion of multihoming, can be avoided. In a plurality of access lines connected to a plurality of provider edge apparatuses, however, only one system is set in an active status, while the remaining other systems are set in a non-active status. Efficiency of utilizing the access lines therefore decreases.

SUMMARY

One aspect of the present invention is a provider network including:

a plurality of provider edge apparatuses being coupled to a plurality of customer edge apparatuses via a plurality of access lines in order to forward a frame transmitted and received between the plurality of customer edge apparatuses, the plurality of provider edge apparatuses including two or more provider edge apparatuses coupled to a specified customer edge apparatus included in the plurality of customer edge apparatuses via two or more access lines different from each other, each of the two or more provider edge apparatuses, including:

an ingress processing unit to generate an encapsulated frame to be transmitted to another provider edge apparatus coupled to the another customer edge apparatus, wherein the encapsulated frame includes a frame received from the specified customer edge apparatus and directed to the another customer edge apparatus;

an egress processing unit to extract a frame to be forwarded to the specified customer edge apparatus from an encapsulated frame received from the another provider edge apparatus;

a storage to store identifiers of the two or more provider edge apparatuses, wherein the identifiers corresponds to a group identifier indicating an access line group belonging the two or more access lines; and a filter to discard the encapsulated frame or a frame in the encapsulated frame satisfying a filter condition (1) or a filer condition (2), wherein the filter condition (1) is such that an identifier of an provider edge apparatus indicating a transmission source of the encapsulated frame is being stored in the storage, and the filter condition (2) is such that the encapsulated frame is a multicast frame received by each of the two or more provider edge apparatuses, and the provider edge apparatus itself does not correspond one of the two or more provider edge apparatuses performing an output processing of the multicast frame.

Other aspects of the present invention can embrace a provider edge apparatus included in the provider network and a frame filtering method by the provider edge apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE EMBODIMENT

Next, an exemplary embodiment of the present invention will hereinafter be described with reference to the drawings. A configuration in the embodiment is an exemplification, and the present invention is not limited to the configuration in the embodiment. In a network communication system according to the following embodiment, access lines connected respectively to a plurality of provider edge apparatuses are set in an active status, in which status the provider edge apparatuses detect service frames which could become a factor of being looped back and a factor of multiple arrivals (redundant arrivals) in order to avoid the frame looping and the frame redundant arrivals, and filter these service frames.

Figure 1:
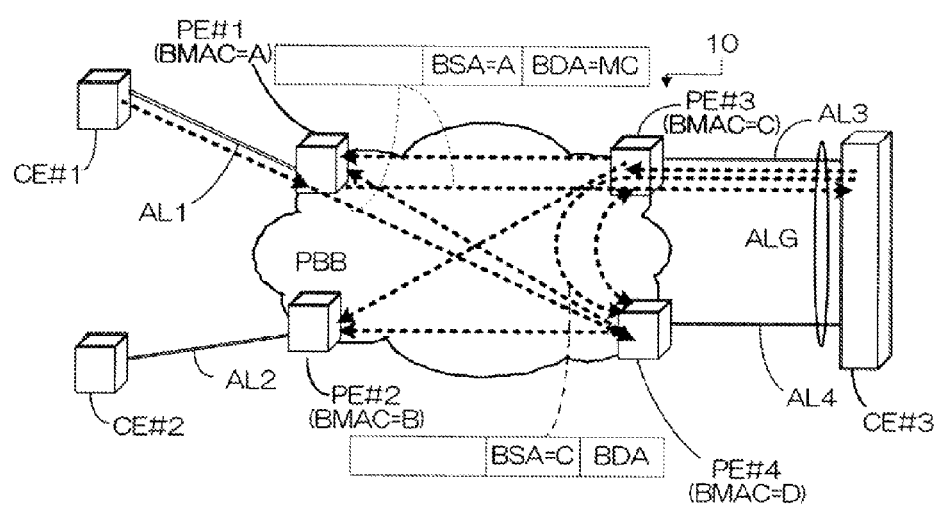
FIG. 1 is a view of an outline of an architecture of a network communication system in an embodiment.

FIG. 1 is a view depicting an example of configuration of the network communication system in the embodiment. In FIG. 1, a network communication system 10 in the embodiment is such that plural provider edge apparatuses PE#1-PE#4 are coupled to each other, thereby configuring a provider network (Provider Backbone Bridges (PBB) network:

backbone network) which utilizes PBB. The PBB network is utilized as a service network that establishes a connection between customer points.

Customer edge apparatuses (CE), which are connected to the PBB network through connections with the provider edge apparatuses (PE) via the access lines, are disposed at the respective customer points. Three customer points embracing the customer edge apparatuses CE#1, CE#2 and CE#3 are illustrated in the embodiment depicted in FIG. 1.

The customer edge apparatus CE#1 is coupled via the access line AL1 to the provider edge apparatus PE#1. The customer edge apparatus CE#2 is coupled via the access line AL2 to the provider edge apparatus PE#2. The customer edge apparatus CE#3 is connected via the access line AL3 to the provider edge apparatus PE#3. The customer edge apparatus CE#3 is connected also to the provider edge apparatus PE#4 via the access line AL4. Thus, in the example depicted in FIG. 1, the multihoming is applied to such a topology that the provider edge apparatuses PE#3 and PE#4 are coupled to the customer edge apparatus CE#3 via the access lines AL3 and AL4.

A backbone MAC address (BMAC) "A" is allocated to the provider edge apparatus PE#1. A backbone MAC address "B" is allocated to the provider edge apparatus PE#2. A backbone MAC address "C" is allocated to the provider edge apparatus PE#3. A backbone MAC address "D" is allocated to the provider edge apparatus PE#4.

Furthermore, each of the provider edge apparatuses PE#1 to PE#4 transmits, for detecting the service frames becoming the factors of the frame looping and the frame redundant arrivals, frames called "access line group information frames (group information frames)" to all of the provider edge apparatuses belonging to the same service.

Figure 2:
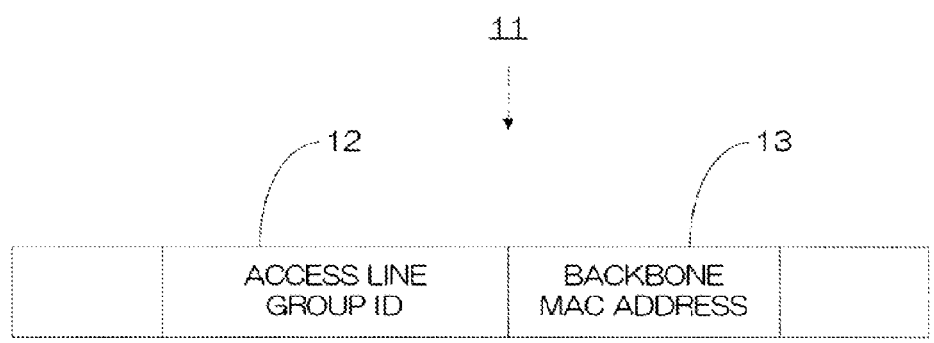
FIG. 2 is an explanatory diagram of an access line group information frame.

FIG. 2 is an explanatory diagram of an example of a format of the access line group information frame. In FIG. 2, an access line group information frame 11 may contain an access line group ID field 12 (field 12) and a backbone MAC address field 13 (field 13). An access line group ID (ALGID) is stored in the field 12. A backbone MAC address of the provider edge apparatus defined as the sender of the access line group information frame is stored in the field 13.

The access line group ID (which is also abbreviated to "ALGID") is an identifier allocated to an access line group consisting of the plurality of access lines which establish the connections between the customer edge apparatuses (customer points) subjected to the multihoming and the PBB network (provider network). Namely, the same identifier "ALGID" is allocated to the plurality of access lines which connect the customer edge apparatuses to the PBB network. The identifier ALGID is set in the provider edge apparatus which accommodates the access lines that hold ALGID. A variety of known techniques may be applied to an ALGID allocation method. For instance, in the network system illustrated in FIG. 1, an operator of the PBB network may set a unique identifier ALGID in each of the provider edge apparatuses PE#1-PE#4.

In the network system illustrated in FIG. 1, the same access line group ID "GGG" is allocated to the access line AL3 which establishes the connection between the customer edge apparatus CE#3 and the provider edge apparatus PE#3 and to the access line AL4 which establishes the connection between the customer edge apparatus CE#3 and the provider edge apparatus PE#4.

Moreover, an access line group ID "GGH" different from a group ID ("GGI") of the access line AL2 and the group ID of the access lines AL3, AL4 is allocated to the access line AL1 that couples the customer edge apparatus CE#1 with the provider edge apparatus PE#1.

Similarly, the access line group ID "GGI" different from the group IDs of the access line AL1 and of the access lines AL3, AL4 is allocated to the access line AL2 that couples the customer edge apparatus CE#2 to the provider edge apparatus PE#2.

The group information frame is, as described above, transmitted from each of the provider edge apparatuses to all of the provider edge apparatuses belonging to the same service. The provider edge apparatus receiving the group information frame can specify the provider edge apparatus as the sender of the group information frame from the backbone MAC address stored in the field 13, and can further specify "ALGID" allocated to the access lines connected to the sender provider edge apparatus from "ALGID" stored in the field 12.

The "ALGID" is, as mentioned above, the identifier allocated to the access lines accommodated by the provider edge apparatus and is set in each of the provider edge apparatus which accommodates each of the access lines. It can be therefore considered that the provider edge apparatus, which accommodates the access line belonging to a certain access line group, belongs to the access line group concerned. Accordingly, the following discussion employs such an expression that "(ALGID of) the access line group to which the provider edge apparatus belongs" represents "(ALGID of) the access line group to which the access lines accommodated by the provider edge apparatus belong" as the case may be.

Next, an example of configurations of the provider edge apparatuses PE#1-PE#4 will be explained. In the embodiment, the provider edge apparatuses PE#1-PE#4 have the same configuration, and therefore the discussion will be made in a way that takes an example of the provider edge apparatus PE#3.

Figure 3:
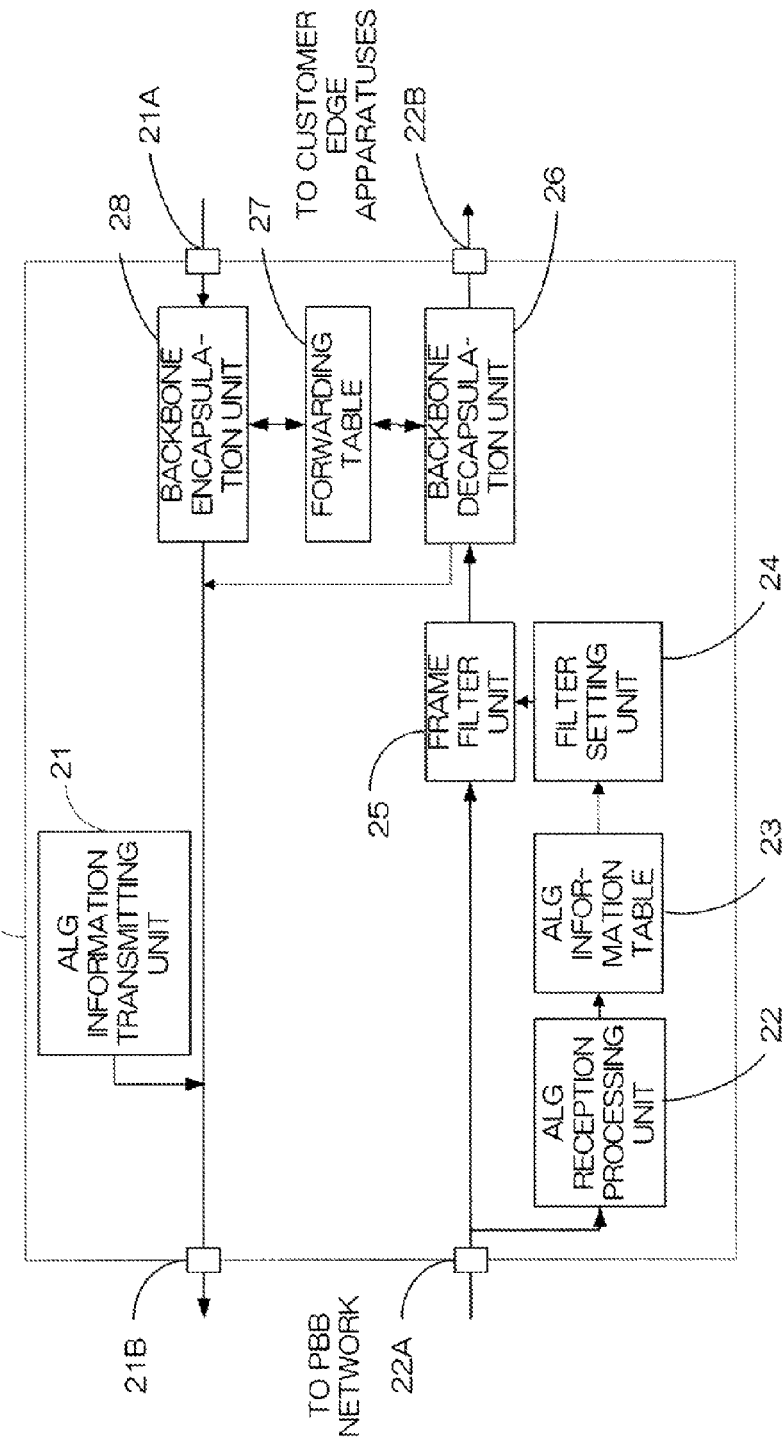
FIG. 3 is a block diagram of an outline of a configuration of a provider edge apparatus.

FIG. 3 is a block diagram schematically illustrating the example of the configuration of the provider edge apparatus PE#3. In FIG. 3, the provider edge apparatus PE#3 includes, if roughly classified, an access line group (ALG) information transmitting unit 21 (which is also simply referred to as the "transmitting unit 21"), an access line group (ALG) information reception processing unit 22 (which is also simply referred to as the "reception processing unit 22"), an access line group (ALG) information table 23 (which is also simply referred to as the "table 23") and a filter setting unit 24. The filter setting unit 24 is one example of a filter controller.

Further, the provider edge apparatus PE#3 includes a frame filter unit 25 (which is also simply referred to as the "filter unit 25"), a backbone decapsulation unit 26 (which is also simply referred to as the "decapsulation unit 26"), a forwarding table 27 (which is also simply referred to as the "table 27") and a backbone encapsulation unit 28 (which is also simply referred to as the "encapsulation unit 28"). The filter unit 25 is one example of a filter. The decupsulation unit 26 is one example of a decupsulator. The encupsulation unit 28 is one example of an encupsulator.

In a plurality of blocks depicted in FIG. 3, the decapsulation unit 26, the forwarding table 27, the encapsulation unit 28 and the filter unit 25 are realized by use of pieces of dedicated hardware or pieces of general-purpose hardware (such as electrical/electronic circuits (ASICs (Application-Specific Integrated Circuits), etc)). The access line group information transmitting unit 21, the access line group information reception processing unit 22 and the filter setting unit 24 may be realized by employing the dedicated or general-purpose hardware.

Alternatively, the access line group information transmitting unit 21, the access line group information reception processing unit 22 and the filter setting unit 24 may be also realized as functions obtained by processing softwarewise, i.e., in a way that a processor (microprocessor) such as a Central Processing Unit (CPU) and a Digital Signal Processor (DSP) loads a program stored on a storage (ROM (Read-Only Memory), flash memory, Hard Disc (HDD), etc) into a RAM (Random Access Memory) and executes the program. The table 23 is structured in a predetermined storage area on the storage incorporated into the provider edge apparatus.

The backbone encapsulation unit 28, the backbone decapsulation unit 26 and the forwarding table 27 operate in the same way as the backbone bridge pursuant to IEEE 802.1ah operates. To be specific, the backbone encapsulation unit 28 receives the MAC frame (service frame) received by a receiving unit (receiver) 21A incorporated into the provider edge apparatus on the side of the customer edge apparatus. The backbone encapsulation unit 28 encapsulates the service frame with the backbone MAC frame.

At this time, a backbone destination MAC address associated with a destination MAC address of the service frame is obtained from the forwarding table 27 by referring to this forwarding table 27 and is set in the backbone MAC frame. The encapsulated service frame (backbone MAC frame) is forwarded to an output port included in a transmitting unit (transmitter) 21B incorporated into the provider edge apparatus on the side of the PBB network, which is associated with the service frame destination MAC address stored in the forwarding table 27, and is transmitted to the PBB network from this output port. Thus, the encapsulation unit 28 functions as an ingress processing unit for the service frame, whereby the provider edge apparatus is made to function as an ingress edge node of the PBB network.

The backbone decapsulation unit 26 receives the backbone MAC frame received by a receiving unit (receiver) 22A of the provider edge apparatus on the side of the PBB network and passing through the frame filter unit 25. The backbone decapsulation unit 26 refers to the backbone destination MAC address (B-DA) contained in the backbone MAC frame. At this time, if the destination MAC address "B-DA" is not the backbone MAC address or multicast MAC address, the decapsulation unit 26 refers to the forwarding table 27 and thus forwards the backbone MAC frame toward the output port of the transmitting unit (transmitter) 21B, which is associated with the address "B-DA". The backbone MAC frame is thereby transferred to the target provider edge apparatus having the address "B-DA".

Whereas if the address "B-DA" in the backbone MAC frame is the backbone MAC address of the provider edge apparatus PE#3 or multicast MAC address, the decapsulation unit 26 extracts the service frame from the backbone MAC frame. The decapsulation unit 26 specifies the output port (on the side of the customer edge apparatus) associated with the destination MAC address of the service frame by referring to the forwarding table 27 and forwards the service frame to the specified output port. The output port is included in the transmitting unit 22B incorporated into the provider edge apparatus on the side of the customer edge apparatus. The service frame is transmitted from the output port to the customer edge apparatus CE#3 via the access line AL3 (FIG. 1) coupled to the output port. Thus, the decapsulation unit 26 functions as an egress processing unit for the service frame, whereby the provider edge apparatus is made to function as an egress edge node of the PBB network.

The forwarding table 27 stores, at least, the MAC addresses of the customer edge apparatuses, the MAC addresses (backbone MAC addresses) of the provider edge apparatuses within the PBB network, pieces of specifying (identifying) information (IDs) of the output ports on the side of the PBB network and pieces of specifying information (IDs) of the output ports on the side of the customer edge apparatuses in the way of being associated with each other.

The access line group information transmitting unit 21 periodically transmits the group information frame 11 (FIG. 2) for notification of the access line group ID to the provider edge apparatuses (which are the provider edge apparatuses PE#1, PE#2 and PE#4 in the network system illustrated in FIG. 1) which provide the same service. The group information frame undergoes setting of "B-DA" of the group information frame so as to be received by all of the provider edge apparatuses belonging to the same access line group. In the embodiment, "B-DA" is set in the group information frame transmitted by the transmitting unit 21 of the provider edge apparatus PE#3 so as to reach at least the provider edge apparatus PE#4.

The access line group information reception processing unit 22 receives the access line group information frame 11 transmitted from each of other provider edge apparatus (which are the provider edge apparatuses PE#1, PE#2 and PE#4 in FIG. 1), and analyzes contents thereof. The reception processing unit 22, if the same access line group ID "ALGID" as "ALGID" set in the provider edge apparatus (provider edge apparatus PE#3) to which the reception processing unit 22 belongs is contained in the field 12 of the group information frame 11, fetches the backbone MAC address (B-SA) stored in the field 13 in the received access line group information frame, and adds (registers) this MAC address in the access line group information table 23.

In the embodiment, the same identifier "ALGID" is allocated to the access lines AL3 and AL4 (the provider edge apparatuses PE#3 and PE#4). Therefore, the backbone MAC address "D" of the provider edge apparatus PE#4 is added to the access line group information table 23 of the provider edge apparatus PE#3. On the other hand, the backbone MAC address "C" of the provider edge apparatus PE#3 is added to the access line group information table 23 of the provider edge apparatus PE#4 (see FIG. 9).

The filter setting unit 24 sets a filter condition in the frame filter unit 25 in accordance with the contents of the access line group information table 23. The frame filter unit 25 discards the backbone MAC frame coincident with the filter condition set by the filter setting unit 24.

A way of how the setting is done in the frame filter unit 25 will hereinafter be discussed. The filter setting unit 24 of the provider edge apparatus implements, in the frame filter unit 25, a filter condition for discarding (intercepting) the backbone MAC frame, in which the backbone MAC address (BMAC) registered in the table 23 is set to be "B-SA".

In the embodiment, the provider edge apparatus PE#3 and the provider edge apparatus PE#4 have the same access line group ID. Therefore, the backbone MAC frame, in which the backbone MAC address "C" of the provider edge apparatus PE#3 is set to be "B-SA", is discarded by the filter unit 25 of the provider edge apparatus PE#4. Similarly, the backbone MAC frame, in which the backbone MAC address "D" of the provider edge apparatus PE#4 is set to be "B-SA", is discarded by the filter unit 25 of the provider edge apparatus PE#3.

The setting of the filter condition described above can prevent such a status (i.e., the frame looping) that the MAC frame (service frame) transmitted to any one of the provider edge apparatuses PE#3 and PE#4 from the customer edge apparatus CE#3 is returned in loopback to the customer edge apparatus CE#3 via the other of the provider edge apparatuses PE#3 and PE#4.

Further, the following filter condition is set in the plurality of provider edge apparatuses each having the backbone MAC address registered in the access line group information table 23. To be specific, the plurality of provider edge apparatuses registered in the table 23 receives the backbone MAC frame (multicast frame) in which a multicast address is set as the backbone destination MAC address, in which case only a predetermined single provider edge apparatus (node) in the plurality of provider edge apparatuses forwards the multicast frame (makes the multicast frame transmitted), while the remaining provider edge apparatuses (nodes) discard the multicast frame.

The provider edge apparatus, which makes the multicast frame transmitted, can be properly selected. For example, the filter setting unit 24 can set the filter condition in the filter unit 25 so that the provider edge apparatus holding the backbone MAC address having a minimum value or a maximum value in the plurality of backbone MAC addresses (registered in the table 23) associated with a certain access line group ID makes the multicast frame transmitted, while the remaining nodes discard the multicast frame.

For instance, in the case of setting the filter condition under which the provider edge apparatus holding the backbone MAC address having the minimum value makes the multicast frame transmitted, an assumption is that a certain provider edge apparatus receives the multicast frame. At this time, if the backbone MAC address of this unspecified provider edge apparatus takes the minimum value, the unspecified provider edge apparatus concerned makes the multicast frame transmitted but, whereas if not, discards the multicast frame.

In the embodiment, an assumption is that in the provider edge apparatuses PE#3 and PE#4 (FIG. 3) belonging to the same access line group (holding the same access line group ID), the backbone MAC address of the provider edge apparatus PE#3 has the minimum value. Therefore, the filter condition is set so that only the provider edge apparatus PE#3 makes the multicast frame transmitted.

For example, it is assumed that the provider edge apparatus PE#1 depicted in FIG. 1 multicasts the backbone MAC frame by flooding, which contains the service frame received from the customer edge apparatus CE#1. In this case, multicast addresses used for other provider edge apparatuses providing the same service to receive the multicast frame are set in a "B-DA" field of the backbone MAC address of the multicasted frame (multicast frame). Accordingly, the multicast frame is received by the provider edge apparatuses PE#3 and PE#4.

At this time, if the filter condition for the filter unit 25 described above is set in the provider edge apparatuses PE#3 and PE#4, the provider edge apparatus PE#3 forwards the service frame in the multicast frame (makes the multicast frame transmitted) to the customer edge apparatus CE#3. While on the other hand, the provider edge apparatus PE#4 discards the multicast frame. Accordingly, only the service frame sent from the provider edge apparatus PE#3 reaches the customer edge apparatus CE#3. Thus, the redundant arrival of the service frame is prevented. It should be noted that the embodiment adopts the configuration that the filter unit 25 discards the backbone MAC frame (encapsulated frame) and may also adopt another configuration that the filter unit 25 discards the frame (service frame) in the encapsulated backbone MAC frame according to the filter condition.

As discussed above, according to the embodiment, in the provider network (PBB network) which provides the service for transmitting the MAC frame between the customer points (customer edge apparatuses), the multihoming can be implemented without executing STP between the PBB network and the customer points. Within this multihoming, the efficiency of utilizing the access lines and the edge apparatuses in the provider network can be enhanced, thereby enabling the services to be received more efficiently.

The embodiment will be described in greater detail. As mentioned above, the access line group ID "GGG" is allocated to the two access lines AL3, AL4 accommodating the customer edge apparatus CE#3. Further, it is assumed that the backbone frame, with which the MAC frame (service frame) transmitted mutually among the customer edge apparatus CE#1, the customer edge apparatus CE#2 and the customer edge apparatus CE#3 is encapsulated, holds a service identifier (ISID) "X" and a backbone VLAN identifier (BVID) "Y".

Figure 4:
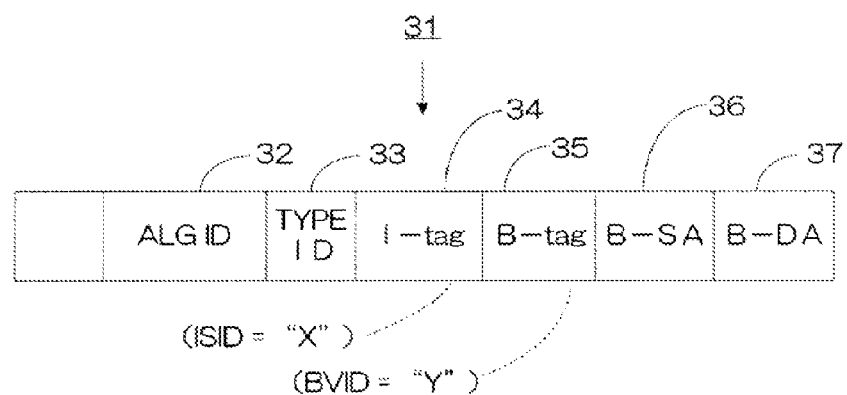
FIG. 4 is an explanatory diagram of a first specific example of the access line group information frame.

FIG. 4 is an explanatory diagram of a first specific example of the access line group information frame. An access line group information frame 31 depicted in FIG. 4 is a detailed illustration of the group information frame 11 illustrated in FIG. 2. In FIG. 4, the group information frame 31 contains an access line group ID field 32, a type ID field 33, an ISID field 34, a BVID field 35, a backbone source MAC address (B-SA) field 36 and a backbone destination MAC address (B-DA) field 37.

The following items of information are stored in the access line group information frames transmitted respectively from the provider edge apparatuses PE#3, PE#4. The same access line group ID "GGG" is set in the access line group ID field 32. A piece of data (identifier) representing that the frame concerned is the access line group information frame is stored as a frame type ID in the type ID field 33. The ISID field 34 is stored with a service identifier (ISID: I-tag) "X". The BVID field 35 is stored with a backbone VLAN identifier (BVID: B-tag) "Y".

The B-SA field 36 is stored with the backbone MAC address of the provider edge apparatus as the sender of the access line group information frame 31. The B-DA field 37 is stored with a service instance group address as "B-DA". The service instance group address is defined as one type of multicast address specified in IEEE 802.1ah and is an address for multicasting to destinations of the edge nodes belonging to the same service. The group information frame 31 is thereby received by all of the provider edge apparatuses undergoing the setting of the service instance. In the embodiment, the provider edge apparatuses PE#1-PE#4 belong to the same service, and hence the group information frame 31 is mutually transmitted and received among the provider edge apparatuses PE#1-PE#4.

Figure 5:
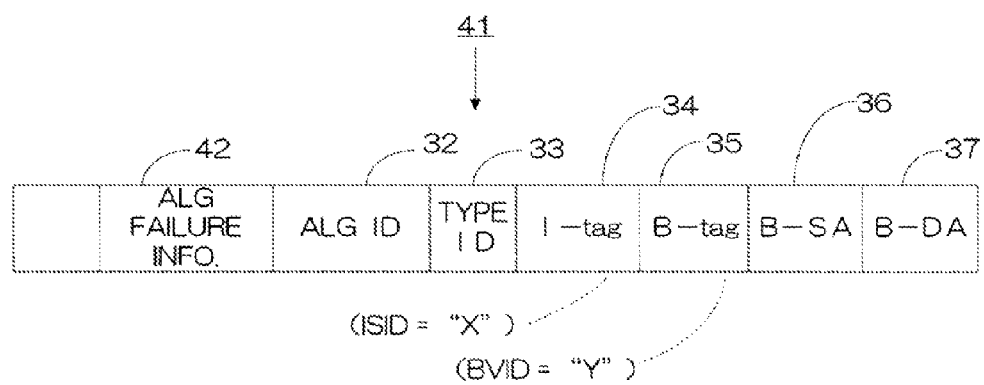
FIG. 5 is an explanatory diagram of a second specific example of the access line group information frame.

FIG. 5 is an explanatory diagram of a second specific example of the access line group information frame. In FIG. 5, an access line group information frame 41 has a format in which an access line failure information field 42 is added to the fields of the access line group information frame 31 depicted in FIG. 4. The field 42 is stored with access line failure information representing whether a failure occurs in the access line or not. In the access line failure information, e.g., 1 bit ("0" or "1") can be allocated to "occurrence of failure" and "no occurrence of failure", respectively. Alternatively, the access line failure information can be expressed by a predetermined bit value representing whether the failure occurs or not. In the case of its being expressed by 2 or larger bits, an apparatus failure and a link (access line) failure can be used, separately. Note that the field 42 is an option field, and the use of which frame, the frame 31 or the frame 41, as the access line group information frame can be properly selected.

Figure 6:
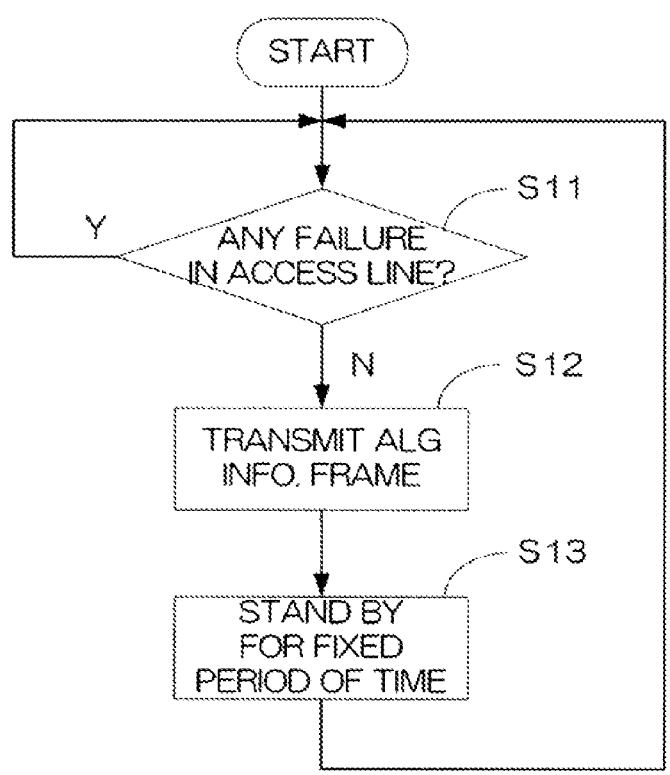
FIG. 6 is a first processing flowchart of an access line group information transmitting unit.

The processes of the provider edge apparatus illustrated in FIG. 3 will hereinafter be described. FIG. 6 is a first processing flowchart which depicts processes of the access line group information transmitting unit 21. FIG. 6 depicts the processes of the transmitting unit 21 in such a case that the group information frame 31 not containing the access line failure information field 42 is applied as the group information frame. A start of the processes depicted in FIG. 6 can be triggered by, e.g., power-on of the provider edge apparatus.

In FIG. 6, the access line group information transmitting unit 21 determines whether there is any failure in the access line or not (step S11). For example, the provider edge apparatus monitors the failure in the access line by use of a known technique such as monitoring a signal input from the access line. Then, the access line group information transmitting unit 21 is notified of information (signal) representing whether the failure occurs in the access line or not. Alternatively, the information representing whether the failure occurs in the access line or not is stored in a predetermined storage area of the storage incorporated into the provider edge apparatus, and the access line group information transmitting unit 21 refers to this item of information and thus determines whether the failure occurs in the access line or not.

If it is determined in step S11 that the failure occurs in the access line (step S11; Yes), the access line group information transmitting unit 21 comes to a standby status without transmitting the group information frame 31 to the PBB network. Namely, the access line group information transmitting unit 21, when the failure is detected in the access line, interrupts the transmission of the group information frame 31.

With this operation, in the case of interrupting the transmission of the group information frame 31 from a certain provider edge apparatus (e.g., PE#3), other provider edge apparatuses (PE#1, PE#2, PE#4), which should receive the group information frame 31, are disabled from receiving the group information frame 31. Other provider edge apparatuses can recognize from such reception-disability of the group information frame 31 that at least any one of the apparatus failure (the failure of the provider edge apparatus itself) and the link failure (the failure in the access lines accommodated by the provider edge apparatus) occurs in the provider edge apparatus holding the backbone source MAC address "B-SA" of the group information frame 31.

In other words, the interruption of the transmission of the group information frame 31 enables the provider edge apparatus detecting the failure in the access line to notify other provider edge apparatuses of the occurrence of the failure. At this time, other provider edge apparatuses can delete, from the access line group information table 23, the backbone MAC address of the provider edge apparatus that has interrupted the transmission of the access line group information frame 31. This is because of reviewing the filter condition.

In step S11, if there is no failure in the access line (step S11; No), the access line group information transmitting unit 21 sends the access line group information frame 31 (step S12). Thereafter, the access line group information transmitting unit 21 stands by for a fixed period of time (step S13), and returns the processing again to step S11. Accordingly, if no failure occurs in the access line, the access line group information transmitting unit 21 cyclically sends the access line group information frame 31.

Figure 7:
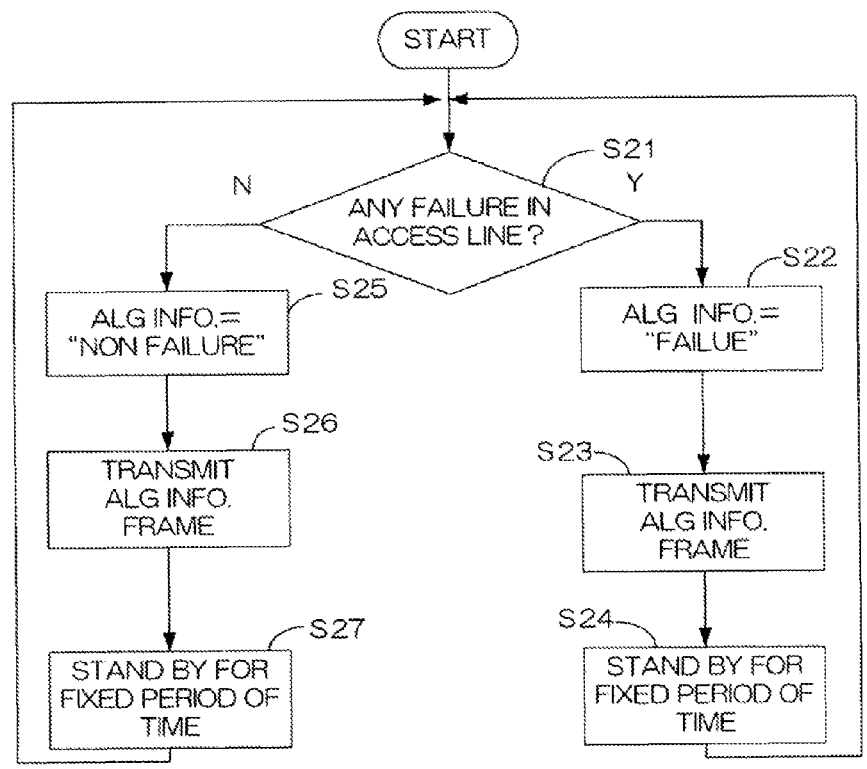
FIG. 7 is a second processing flowchart of the access line group information transmitting unit.

FIG. 7 is a second processing flowchart depicting the processes of the access line group information transmitting unit 21. FIG. 7 illustrates the processes in a case where an access line group information frame 41 is applied as the access line group information frame. Upon starting the processes depicted in FIG. 7, at first, the access line group information transmitting unit 21 determines whether any failure occurs in the access line or not (step S21).

It is determined in step S21 that there is the failure in the access line (step S21; Yes), the access line group information transmitting unit 21 sets, to "occurrence of failure", a value given in the field 42 of the access line group information frame 41 to be transmitted (step S22). Subsequently, the transmitting unit 21 transmits the group information frame 41 (step S23). Then, the transmitting unit 21 stands by for the fixed period of time (step S24) and returns the processing again to step S21.

Whereas if it is determined in step S21 that there is no failure in the access line (step S21; No), the transmitting unit 21 sets, to "no occurrence of failure", the value given in the field 42 of the access line group information frame 41 to be transmitted (step S25). Subsequently, the transmitting unit 21 transmits the group information frame 41 to the PBB network (step S26). Then, the transmitting unit 21 stands by for the fixed period of time (step S27) and returns the processing again to step S21.

Thus, when the access line group information frame 41 is applied, the access line group information frame 41 is cyclically transmitted irrespective of whether there is the failure in the access line or not. Other provider edge apparatuses receiving the access line group information frame 41 refer to the field 42 in which "occurrence of failure" is set and are thereby enabled to recognize that there is the link failure (the failure in the access lines connected to the provider edge apparatus).

Figure 8:
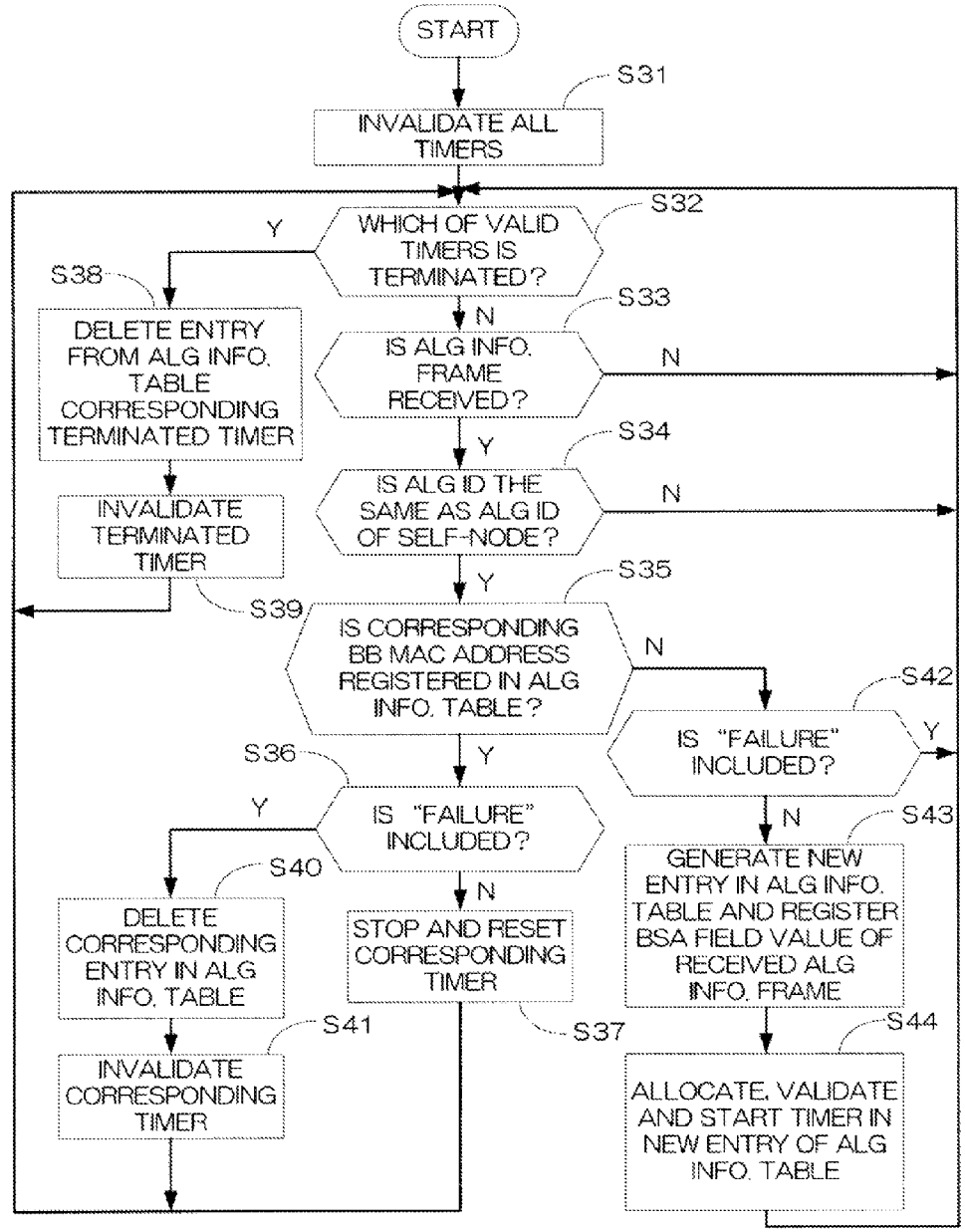
FIG. 8 is a processing flowchart of an access line group information reception processing unit.

FIG. 8 is a flowchart depicting a processing example of the access line group information reception processing unit. FIG. 8 illustrates the processes applicable to both of the access line group information frames 31 and 41. A start of the processes illustrated in FIG. 8 is triggered by, e.g., the power-on of the provider edge apparatus.

The access line group information reception processing unit 22 includes a plurality of unillustrated timers. Upon starting the processes illustrated in FIG. 8, the access line group information reception processing unit invalidates all of the timers (invalidates timer functions) (step S31). In an initial status of invalidating all of the timers, the processing proceeds to next step S32.

Next, the access line group information reception processing unit 22 determines which timer in the valid timers finishes (step S32). In first step S32, it is the initial status, and hence none of the valid timers exist (step S32; No). Accordingly, the access line group information reception processing unit 22 determines whether the access line group information frame is relieved or not (step S33).

If the access line group information frame is not received in step S33 (step S33; No), the processing is returned to step S32, and the processes in steps S32 and S33 are iterated.

Whereas if the access line group information frame is received in step S33 (step S33; Yes), the access line group information reception processing unit 22 refers to the access line group ID field 32 in the frame and thus determines whether or not the access line group ID given in the field 32 is identical with the access line group ID (ALGID) set in the provider edge apparatus (self-node) including the reception processing unit 22 itself (step S34). This determination is executed based on a comparison between the access line group information ID registered in, e.g., the table 23 and the access line group information ID given in the field 32.

If the access line group IDs are identical with each other in step S34 (step S34; Yes), the access line group information reception processing unit 22 extracts the backbone MAC address (B-SA) of the provider edge apparatus as the frame sender from the B-SA field 36 (FIGS. 4 and 5) of the received access line group information frame, and determines whether or not the backbone MAC address is contained in the access line group information table 23 (FIG. 3) (step S35).

If the value stored in the field 36 is not registered in the access line group information table 23 in step S35 (step S35; No), this corresponds to an event that the access line group information frame is received from a new provider edge apparatus (belonging to the same access line group) having the same access line group ID.

Next, the reception processing unit 22 determines whether the access line group information frame contains the information representing "occurrence of failure in access line" or not (step S42). If the access line group information frame does not contain the field 42 (FIG. 5) but contains the frame 31 (FIG. 4) in step S42 and if the access line group information frame is the frame 41 in which the access line failure information field 42 has the setting of "no occurrence of failure", the frame is determined not to contain the information representing "occurrence of failure in access line".

Whereas if the frame does not contain the information representing "occurrence of failure in access line" (step S42; No), the reception processing unit 22 adds a new entry to the access line group information table 23. Further, the reception processing unit 22 stores, in the new entry, the backbone MAC address (B-SA) contained in the field 36 of the received access line group information frame (step S43).

Moreover, the reception processing unit 22 allocates one new timer to the new entry, and the timer starts counting (step S44). Thereafter, the processing gets back to step S32. A value of the timer is set to a several-fold value as large as a transmission cycle of the access line group information frame. Then, if the cyclic reception of the access line group information frame from the provider edge apparatus stops for a variety of reasons such as the failure in the corresponding provider edge apparatus and the failure in the access lines connected to the provider edge apparatus, an event of termination of the timer occurs.

If the value stored in the B-SA field 36 is registered in the access line group information table 23 in step S35 (step S35; Yes), the reception processing unit 22 determines whether or not the frame contains the information representing "occurrence of failure in access line" (step S36). In step S36, the same process as step S42 is carried out.

If it is determined in step S36 that the frame contains none of the information representing "occurrence of failure in access line" (step S36; No), the reception processing unit 22 stops the associated timer, then sets the value of the timer back to the initial value and resumes the counting by the timer (step S37), and the processing returns to step S32.

Whereas if it is determined in step S36 that the frame contains the information representing "occurrence of failure in access line" (step S36; Yes), the reception processing unit 22 deletes the associated entry from the associated access line group information table 23 (step S40) and invalidates the timer (timer function) by stopping the associated timer (step S41).

Further, if any one of the valid timers is finished in the determination in step S32 (step S32; Yes), as described above, what is presumed is the occurrence of the failure (apparatus failure) in the corresponding provider edge apparatus or the occurrence of the failure (link failure) in the access lines connected to the provider edge apparatus. Therefore, the reception processing unit 22 deletes the entry of the provider edge apparatus pertaining to the failure from the access line group information table 23 (step S38), and invalidates the timer (step S39). Thereafter, the processing returns to step S32.

Through the above-mentioned processes of the reception processing unit 22, a list of the backbone MAC addresses of other provider edge apparatuses holding the same access line group ID as the ID of the provider edge apparatus concerned but not having the apparatus failure and the access line failure (link failure), is created in the access line group information table 23.

Figure 9:
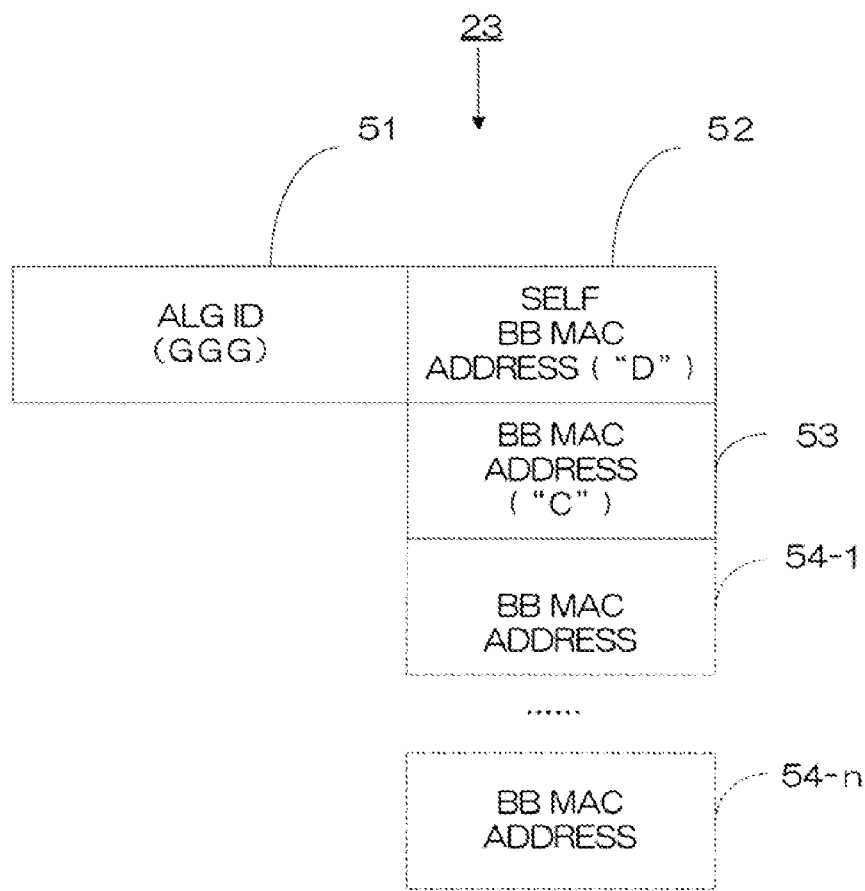
FIG. 9 is an explanatory diagram of an outline of a structure of an access line group information table.

FIG. 9 is a diagram depicting an example of a structure of the access line group information table 23. The table 23 has one or more entries associated with the access line group ID(s), in which each entry is stored with the backbone MAC address of the provider edge apparatus belonging to the access line group specified (identified) by the access line group ID.

In the example depicted in FIG. 9, the access line group ID "GGG", to which the provider edge apparatuses PE#3 and PE#4 (FIG. 1) (access lines AL3 and AL4) belong, is registered as the access line group ID in the table 23 (refer to region 51). An entry 52 containing the backbone MAC address "D" of the provider edge apparatus PE#4 and an entry 53 containing the backbone MAC address "C" of the provider edge apparatus PE#3 are registered in the way of being associated with this group ID "GGG". What is presumed as the table 23 depicted in FIG. 9 is the table 23 held by the provider edge apparatus PE#4, in which the backbone MAC address "D" of the provider edge apparatus PE#4 itself is registered in the top entry.

A new provider edge apparatus connected to the customer edge apparatus CE#3 via the access lines different from the access lines AL3 and AL4 is installed in the PBB network, in which case there is added an entry (refer to entry 54-1 in FIG. 9) stored with the backbone MAC address of this new provider edge apparatus. Each time the provider edge apparatus connected to the customer edge apparatus CE#3 via the new access lines increases in number, the entry of the associated backbone MAC address is added to the table 23.

On the other hand, if the apparatus failure pertaining to the provider edge apparatus or the access line failure occurs, the entry of the provider edge apparatus related to the failure is deleted from the table 23. Thus, the table 23 functions as the list of the backbone MAC addresses of the (normal) provider edge apparatuses with no failure, which respectively hold the access line group ID.

The filter setting unit 24 (FIG. 3) sets the filter condition in the frame filter unit 25 on the basis of the access line group information table 23 stored with the list of the backbone MAC addresses, which is created on the table 23.

Figure 10:
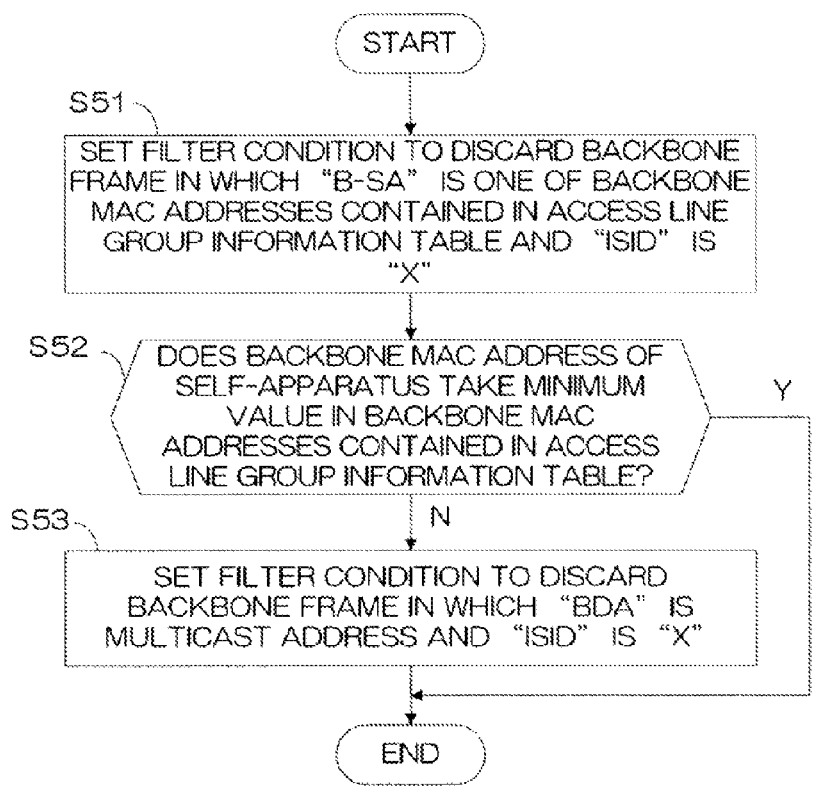
FIG. 10 is a processing flowchart in a filter setting unit.
Figure 11:
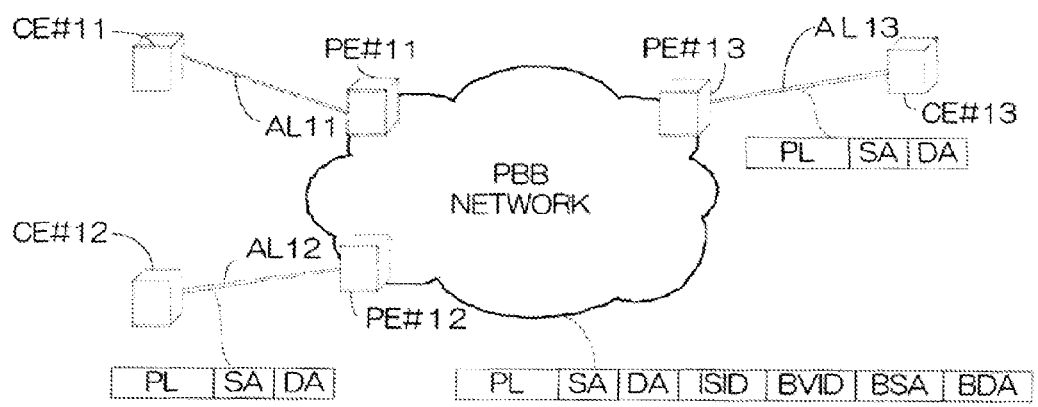
FIG. 11 is an explanatory view of a conventional example of a service providing network for providing a MAC frame transmission service of Ethernet (registered trademark) by use of PBB.
Figure 12:
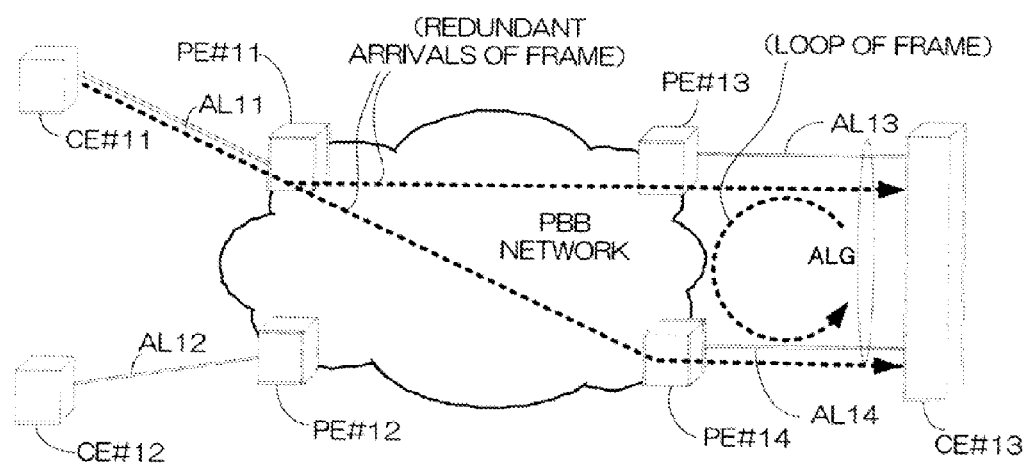
FIG. 12 is an explanatory view of a conventional example of realizing multihoming in the service providing network which uses the PBB and of a problem that arises at that time.
Figure 13:
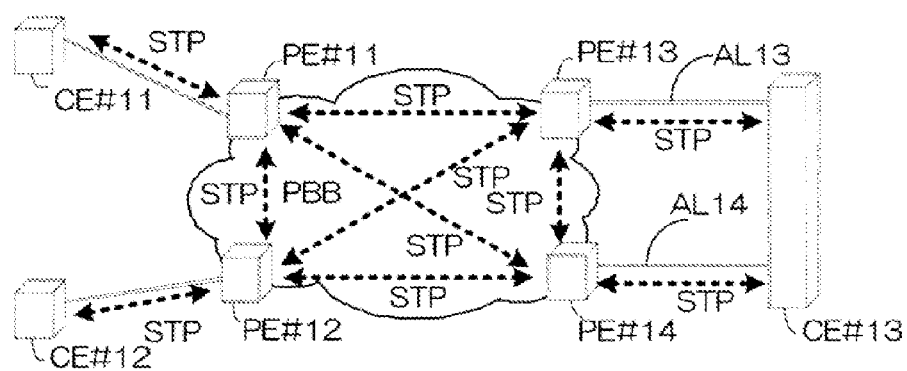
FIG. 13 is an explanatory diagram of a conventional example in the case of using STP.

FIG. 10 is a flowchart illustrating an example of processes of the filter setting unit 24. The processes depicted in FIG. 10 are started each time the filter setting unit 24 monitors an update of the contents of the access line group information table 23 and the contents thereof are updated.

To be specific, the filter setting unit 24 sets, in the frame filter unit 25, the filter condition for discarding the backbone MAC frame in which "B-SA" is one of the backbone MAC addresses contained in the access line group information table 23 and the service identifier (ISID) is "X" (step S51).

The frame filter unit 25 discards, under the filter condition such as this, the backbone MAC frame transmitted from the provider edge apparatus holding the same access line group ID and in which to set the service identifier (ISID) applied to the customer edge apparatus connected via the access line related to (belonging to) the access line group.

For instance, it is assumed that the provider edge apparatus PE#3 receives the service frame via the access line AL3 from the customer edge apparatus CE#3, and that the backbone MAC frame, in which the backbone MAC address "C" of the provider edge apparatus PE#3 is set in the "B-SA" field and the service identifier ISID "X" is set, is forwarded to the provider edge apparatus PE#4.

In this case, the frame filter unit 25 of the provider edge apparatus PE#4 discards the backbone MAC frame sent from the provider edge apparatus PE#3 in accordance with the filter condition set in step S51. The service frame in the backbone MAC frame is thereby forwarded to the customer edge apparatus CE#3 via the access line AL4, i.e., the occurrence of the loop is prevented.

Reversely, the backbone MAC frame having ISID "X", which is forwarded from the provider edge apparatus PE#4 to the provider edge apparatus PE#3, is also discarded by the frame filter unit 25 in the provider edge apparatus PE#3. Thus, there is discarded the backbone MAC frame transmitted and received between the provider edge apparatuses connected to the common customer edge apparatus via the different access lines and having the service identifier (ISID) related to the customer edge apparatus. The occurrence of the loop is thereby avoided.

Referring back to FIG. 10, the filter setting unit 24 determines whether or not a value given in the backbone MAC address of the provider edge apparatus to which the unit 24 itself belongs is the minimum value in the values of the backbone MAC addresses contained in the access line group information table 23 (step S52).

In step S52, if the value given in the backbone MAC address of the provider edge apparatus to which the unit 24 itself belongs is the minimum value in the values of the backbone MAC addresses registered in the access line group information table 23 (step S52; Yes), the provider edge apparatus concerned corresponds to the provider edge apparatus that should make the backbone MAC frame transmitted. In this case, there is no necessity for setting the filter condition in the frame filter unit 25, resulting in an end of the processing.

Further, in step S52, whereas if the value given in the backbone MAC address of the provider edge apparatus to which the unit 24 itself belongs is not the minimum value in the values of the backbone MAC addresses registered in the access line group information table 23 (step S52; No), the backbone MAC frame (multicast frame) related to the flooding should be discarded in the provider edge apparatus concerned. In this case, the filter setting unit 24 performs the setting in the frame filter unit 25 so as to discard the backbone MAC frame in which the multicast address is registered in the B-DA field and the service identifier ISID is "X" (step S53), and terminates the processing.

As described above, the execution of the processes depicted in FIG. 10 is triggered by updating the table 23. Accordingly, for instance, the provider edge apparatus PE#3 receives the group information frame 41 containing the information representing "existence of failure information" from the provider edge apparatus PE#4, in which case the backbone MAC address (entry) of the provider edge apparatus PE#4 is deleted from the table 23 of the provider edge apparatus PE#3 in accordance with the information of "existence of failure information". Then, the filter setting unit 24 of the provider edge apparatus PE#3 initiates the processes depicted in FIG. 10 and sets, in the frame filter unit 25, such a filter condition that the provider edge apparatus PE#3 permits the transmission of the multicast frame related to the flooding in steps S52 and S53. With this contrivance, when the failure occurs in the access line AL4, the provider edge apparatus PE#3 in place of the provider edge apparatus PE#4 can transmit the service frame in the multicast frame to the customer edge apparatus CE#3 via the access line AL3.

As discussed above, according to the embodiment, it is feasible to implement the multihoming which prevents the frame looping and the frame redundant arrivals without executing the STP between the provider network (PBB network) for providing the service for transmitting the MAC frame and the customer edge apparatus CE# and further, by extension, the customer network. This configuration enables the efficiency of utilization of the access lines and the edge apparatuses in the provider network to be enhanced and also enables the services to be received more efficiently.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A provider network, comprising:
a plurality of provider edge apparatuses being coupled to a plurality of customer edge apparatuses via a plurality of access lines in order to forward a frame transmitted and received between the plurality of customer edge apparatuses,
the plurality of provider edge apparatuses including two or more provider edge apparatuses coupled to a specified customer edge apparatus included in the plurality of customer edge apparatuses via two or more access lines different from each other,
each of the two or more provider edge apparatuses, including:
an ingress processing unit to generate a first encapsulated frame to be transmitted to another provider edge apparatus coupled to another customer edge apparatus, wherein the first encapsulated frame includes a frame received from the specified customer edge apparatus and directed to the another customer edge apparatus;
an egress processing unit to extract a frame to be forwarded to the specified customer edge apparatus from a second encapsulated frame received from the another provider edge apparatus; a storage to store identifiers of the two or more provider edge apparatuses, wherein the identifiers correspond to a group identifier indicating an access line group to which the two or more access lines belong; and
a filter to discard the first or the second encapsulated frame or a frame in the first or the second encapsulated frame satisfying a filter condition (1) or a filter condition (2), wherein the filter condition (1) is such that an identifier of a provider edge apparatus indicating a transmission source of the first or the second encapsulated frame is being stored in the storage, and the filter condition (2) is such that the first or the second encapsulated frame is a multicast frame received by each of the two or more provider edge apparatuses, and the provider edge apparatus itself does not correspond one of the two or more provider edge apparatuses performing an output processing of the multicast frame, and
wherein each of the two or more provider edge apparatuses receives a group information frame including the group identifier and an identifier of a provider edge apparatus being a transmission source of the group information frame and stores, in the storage, the group identifier, the identifier of the provider edge apparatus of the transmission source and an identifier of the provider edge apparatus itself in association with each other.

2. The provider network according to claim 1, wherein each of the two or more provider edge apparatuses further comprises:
   a transmission processing unit to transmit the group information frame including the group identifier and the identifier of the provider edge apparatus indicating the transmission source of the group information frame;
   a reception processing unit to store, in the storage, the identifier, included in the group information frame, of the provider edge apparatus of the transmission source when receiving the group information frame; and
   a setting unit to set the filter condition (1) in the filter based on the identifier of the provider edge apparatuses stored in the storage.

3. The provider network according to claim 2, wherein the transmission processing unit cyclically transmits the group information frame and stops transmitting the group information frame when detecting at least any one of a failure in the provider edge apparatus including the transmission processing unit itself and a failure of the access lines accommodated by the provider edge apparatus,
   the identifier of the provider edge apparatus, stored in the storage, that a period of time for which the group information frame is not received from the provider edge apparatus exceeds a threshold value is deleted, and
   the setting unit resets the filter condition (1) of the filter.

4. The provider network according to claim 2, wherein the transmission processing unit cyclically transmits the group information frame further including failure information representing whether or not there is at least any one of the failure in the provider edge apparatus itself including the transmission processing unit itself and the failure of the access lines accommodated by the provider edge apparatus,
   the identifier of the provider edge apparatus, stored in the storage, when receiving the group information frame including the failure information representing "occurrence of failure", and
   the setting unit resets the filter condition (1) of the filter.

5. A provider edge apparatus included in a plurality of provider edge apparatuses coupling with a plurality of customer edge apparatuses via a plurality of access lines and coupling with a specified customer edge apparatus included in the plurality of customer edge apparatuses via a first access line, the provider edge apparatus comprising:
   an ingress processing unit to generate a first encapsulated frame to be transmitted to another provider edge apparatus different from the provider edge apparatus coupled to another customer edge apparatus, wherein the encapsulated frame includes a frame received from the specified customer edge apparatus and directed to the another customer edge apparatus;
   an egress processing unit to extract a frame to be forwarded to the specified customer edge apparatus from a second encapsulated frame received from provider edge apparatuses other than the provider edge apparatus;
   a storage to store an identifier of the provider edge apparatus and an identifier of the another provider edge apparatus when the specified customer edge apparatus is coupled to the another edge apparatus via a second access line included in the plurality of access lines, wherein the identifiers corresponds to a group identifier indicating an access line group to which the two or more access lines belong; and
   a filter to discard the first or second encapsulated frame, received from the provider edge apparatuses other than the provider edge apparatus, or a frame in the first or second encapsulated frame satisfying a filter condition (1) or a filter condition (2),
   wherein the filter condition (1) is such that an identifier of a provider edge apparatus indicating a transmission source of the encapsulated frame is being stored in the storage, and
   the filter condition (2) is such that the encapsulated frame is a multicast frame received by the provider edge apparatus, and the another provider edge apparatus which the identifier thereof is stored in the storage performs an output processing of the multicast frame, and
   wherein the provider edge apparatus receives a group information frame including the group identifier and an identifier of a provider edge apparatus being a transmission source of the group information frame and stores, in the storage, the group identifier, the identifier of the provider edge apparatus of the transmission source and an identifier of the provider edge apparatus itself in association with each other.

6. The provider edge apparatus according to claim 5, further comprising:
   a transmission processing unit to transmit the group information frame including the group identifier and the identifier of the provider edge apparatus indicating the transmission source of the group information frame;
   a reception processing unit to store, in the storage, the identifier, included in the group information frame, of the provider edge apparatus of the transmission source when receiving the group information frame; and
   a setting unit to set the filter condition (1) of the filter based on the identifier of the provider edge apparatuses stored in the storage.

7. The provider edge apparatus according to claim 6, wherein the transmission processing unit cyclically transmits the group information frame and stops transmitting the group information frame when detecting at least any one of a failure in the provider edge apparatus including the transmission processing unit itself and a failure of the access lines accommodated by the provider edge apparatus,
   the identifier of the provider edge apparatus, stored in the storage, that a period of time for which the group information frame is not received from the provider edge apparatus exceeds a threshold value is deleted, and
   the setting unit resets the filter condition (1) of the filter.

8. The provider edge apparatus according to claim 6, wherein the transmission processing unit cyclically transmits the group information frame further including failure information representing whether or not there is at least any one of the failure in the provider edge apparatus itself including the transmission processing unit itself and the failure of the access lines accommodated by the provider edge apparatus,
   the identifier of the provider edge apparatus, stored in the storage, when receiving the group information frame including the failure information representing "occurrence of failure", and
   the setting unit resets the filter condition (1) of the filter.

9. A frame filtering method of a provider edge apparatus included in a plurality of provider edge apparatuses coupling with a plurality of customer edge apparatuses via a plurality of access lines and coupling with a specified customer edge apparatus in the plurality of customer edge apparatuses via a first access line, the method comprising:
   discarding a first encapsulated frame to be transmitted to another provider edge apparatus or a second encapsulated frame received from the another provider edge apparatus other than the provider edge apparatus itself and satisfying a filter condition (1) or a filter condition (2), based on an identifier of the provider edge apparatus and an identifier of another provider edge apparatus corresponding to a group identifier specifying an access line group to which the first access line and a second access line included in the plurality of access lines belong, wherein the identifier of the provider edge apparatus and the identifier of the another provider edge apparatus are stored in a storage when the specified customer edge apparatus is coupled to the another provider edge apparatus via the second access line, wherein the filter condition (1) is such that an identifier of a provider edge apparatus indicating a transmission source of the first or the second encapsulated frame is being stored in the storage, and the filter condition (2) is such that the first or the second encapsulated frame is a multicast frame received by the provider edge apparatus, and the another provider edge apparatus performs an output processing of the multicast frame, and wherein the provider edge apparatus receives a group information frame including the group identifier and an identifier of a provider edge apparatus being a transmission source of the group information frame and stores, in the storage, the group identifier, the identifier of the provider edge apparatus of the transmission source and an identifier of the provider edge apparatus itself in association with each other.

10. The frame filtering method of a provider edge apparatus according to claim 9, further comprising:

transmitting the group information frame including the group identifier and the identifier of the provider edge apparatus indicating the transmission source of the group information frame; storing, in the storage, the identifier, included in the group information frame, of the provider edge apparatus indicating the transmission source when receiving the group information frame; and setting the filter condition (1) of the filter based on the identifier of the provider edge apparatuses stored in the storage.

11. The frame filtering method of a provider edge apparatus according to claim 10, further comprising:

cyclically transmitting the group information frame and stops transmitting the group information frame when detecting at least any one of a failure in the provider edge apparatus including the transmission processing unit itself and a failure of the access lines accommodated by the provider edge apparatus;

deleting the identifier of the provider edge apparatus, stored in the storage, that a period of time for which the group information frame is not received from the provider edge apparatus exceeds a threshold value; and resetting the filter condition (1) to the filter.

12. The frame filtering method of a provider edge apparatus according to claim 10, further comprising:

cyclically transmitting the group information frame further including failure information representing whether or not there is at least any one of the failure in the provider edge apparatus itself including the transmission processing unit itself and the failure of the access lines accommodated by the provider edge apparatus; and deleting the identifier of the provider edge apparatus, stored in the storage, when receiving the group information frame including the failure information representing "occurrence of failure"; and resetting the filter condition (1) of the filter.

* * * * *